United States Patent [19]
Hickey

[11] 3,839,845

[45] Oct. 8, 1974

[54] ANIMAL COAT

[75] Inventor: Brian James Hickey, Carlingford, New South Wales, Australia

[73] Assignee: Gollin & Company Limited, New South Wales, Australia

[22] Filed: Apr. 27, 1972

[21] Appl. No.: 248,305

[30] Foreign Application Priority Data
May 7, 1971 Australia............................. 4833/71

[52] U.S. Cl. ................................................. 54/79
[51] Int. Cl. ........................................... B68c 1/00
[58] Field of Search ........................................ 54/79

[56] References Cited
UNITED STATES PATENTS
1,221,256  4/1917  Wilcox .................................... 54/79
2,131,495  9/1938  Allen ...................................... 54/79

Primary Examiner—Antonio F. Guida
Assistant Examiner—J. Q. Lever
Attorney, Agent, or Firm—Stevens, Davis, Miller & Mosher

[57] ABSTRACT

A protective coat for sheep consisting of a sheet of flexible material, fixed to the animal by the combination of an elastic rump opening and fixed, nonadjustable hind leg ties.

6 Claims, 2 Drawing Figures

ANIMAL COAT

This invention relates to protective coats for four-legged wool-growing animals, and has particular application to coats for sheep.

It has been known (from as early as Phoenician civilization) to provide a coat for sheep which may be put on immediately after shearing and left on during wool growth, in order to preserve the quality of the fleece, and to protect the sheep against, inter alia, post-shearing death, fly-strike and gress seed infestation.

Coats of this nature should, if possible, be suitable for use on a range of animal sizes, for example, on different breeds of sheep of different average size and particularly, in the case of sheep, the coat must allow for increase in size with wool growth.

An economically viable coat must combine the features of durability and cheapness, and must be easily put on and removed from the sheep and require little attention during wool growth, so that labour costs are minimized.

The present invention relates to a method of satisfactorily retaining the coat on the animal while allowing for size variation or growth without the need for special adjustment either at the time of application or during such growth.

Prior coats used for sheep, in those cases where provision for growth or size variation has been made, have employed adjustable ties of various types, all of which have required adjustment during fitting on the sheep. The labour involved in tying coats individually for a large number of sheep is clearly undesirable and the present invention has for a particular object the provision of a self-adjusting coat which eliminates this labour.

The design of these prior art coats has also necessitated adjustment of ties, or the changing of coat sizes, during the year, and this has resulted in such an increase in the labour costs that the benefits of the rugs have in many cases been outweighed by the cost of their use.

A major difficulty which has been experienced in the development of a satisfactory sheep rug, in addition to those outlined already, arises from the fact that the rug has to be very loose on a shorn sheep in order to allow for wool growth, and for the growth of the sheep during the year. A consequence of this has been that prior art designs, in attempting to provide this room for growth, have had loose sides, backs and fronts, which have caught on trees, fences and other obstructions, causing damage to or destruction of the coat.

The present invention is the result of an extensive program to develop a coat which substantially avoids the disadvantages of the prior art, while at the same time being capable of sufficiently cheap production to yield the economic advantages long recognized as being possible with the use of such coats.

The essence of the invention lies in the combination, for the first time, of fixed, non-adjustable leg ties for fixing the coat to the hind legs, and a circumferentially elastic rump opening disposed approximately in a vertical plane.

This combination is an elegant and effective solution to the problem of providing a means of fixing the coat firmly to the animal while at the same time providing for growth of the animal and the wool, and avoiding snagging. The elasticized rump opening acts to provide upward tension against the fixed leg ties passing around the upper part of the back legs, thereby providing in effect a self-adjusting action for these ties, while at the same time providing for outward expansion with growth. It is also, found, most importantly that when this combination of features is employed, wool growth external to but adjacent the elasticized rump opening covers the edge of the coat, substantially preventing the snagging which has occurred with prior art coats having an equivalent allowance for wool and animal growth.

Great economies are possible with the elimination of the necessity for adjustable leg ties, since the fixed ties may be formed simply by the provision of slits in the lower portion of the coat itself adjacent each hind leg, these slits being formed simultaneously with the cutting or stamping out of the coat from the sheet stock of which it is formed.

Attention has so far been focussed on the rear end of the coat forming the subject matter of the present invention, in its preferred form, however, the coat in accordance with the present invention is further characterized by a novel front end, this comprising a neck opening and a portion adapted to pass around the chest of the animal, the neck opening comprising a circumferentially elasticized portion separated from the chest portion by non-elasticized portions.

It has been found that such a front arrangement, in combination with the back arrangement already described, enables the coat to remain on the animal satisfactorily, combining the anti-snagging action already described in relation to the rump opening, with the elimination of the need for any front leg ties whatsoever. In the preferred form of the invention, the bottom edges of the coat are tapered upwardly from the rear to pass across the top of the forelegs approximately at the region of their connection with the body of the sheep, and it is found that no ties are required. This is a great advantage, since the tangling of the forelegs in the front ties has been a great problem in the prior art.

Before considering in detail a preferred form of the invention, it may be finally mentioned that in accordance with a further preferred form of the invention, longitudinally elasticized portions are provided on the lower free edges of the coat, to provide a degree of "tuck under" action along these edges.

The invention will now be described by way of example with reference to the accompanying drawings in which.

Figure 1:
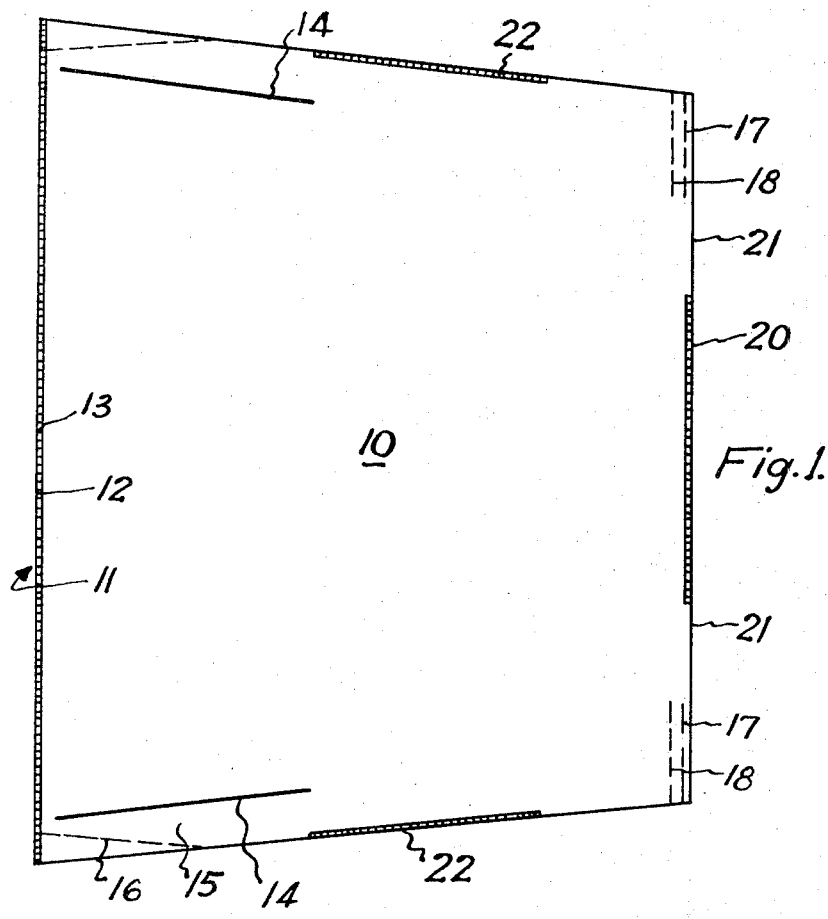
FIG. 1 shows a sheep coat in an almost-completed form.

The illustrated coat is cut as a trapezoidal shape 10 from a sheet of woven, split-film stretched polyethylene tape, such as is available under the trade mark Polyfabric. This material contains a high concentration of ultra-violet inhibitors to reduce the otherwise deleterious effect of long exposure to sunlight, and its other characteristics of lightness, durability and inexpensiveness make it the most suitable material yet found for the present application.

The longer end 11 of the trapezoidal sheet 10, which is of course the rump-surrounding end, has a length of elastic material 12, in the preferred case neoprene rubber, fixed along it. The neoprene rubber strip has a natural length approximately one-half that of the rump end along which it is stretched, so of course it gathers and rumples that edge when fixed along it and released. In the drawings, the coat is shown with its various elasticized edges stretched to their maximum extent for purposes of clarity.

The neoprene rubber strip 12 is fixed to the inside of the sheet 10 at the edge, by stitching 13. Alternative fixing techniques, such as a folded hem, may be employed for this purpose.

Figure 2:
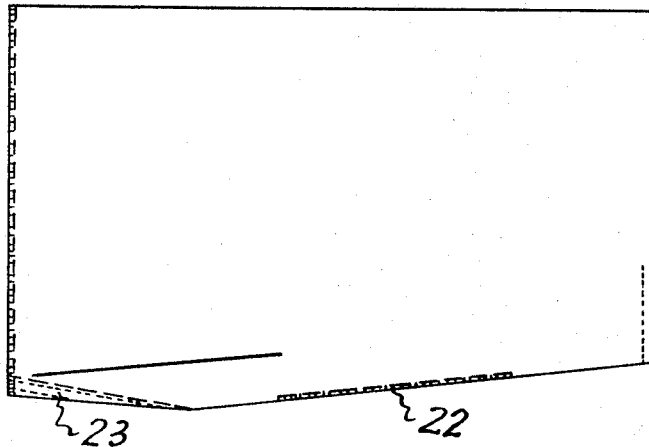
FIG. 2 shows the coat of FIG. 1, completed, in side elevation.

Adjacent the side edges of the sheet 10 and the rear of the coat there are provided a pair of slits 14, which form a rear leg tie portion 15 which passes across the inside of the sheep's upper leg when the leg is passed through the slit 14 in applying the coat to the sheep. Indicated at 16 by broken lines are lines along which the fabric of the coat is folded and sewn (23 in FIG. 2) to reinforce the rearward end of the portion 15.

The narrower front end of the coat 10 is incomplete in FIG. 1 to the extent that the front edges have not yet been joined by double sewing along the lines 17 and 18, to form the part of the coat front which passes around the chest region of the sheep. In production the coat is folded along its centre line and sewn along the lines 17 and 18, and it is important to note that this sewing should be carried out without any folding of the material, but rather by simply laying the flat edge surfaces against each other. In this way the bottom of the neck opening 20 which is formed by this sewing together to form the chest portion 19, has its edges outwardly directed so that there is no danger of them cutting the throat of the sheep.

The neck opening 20 has a central portion of its edge elasticized in the same manner as has been described above in relation to the rump surrounding edge 11. It will be noted that this elasticized portion is separated on each side from the upper end of the chest portion 19, by unelasticized portions 21. This has been found necessary to provide the correct fit around the woolly neck, and to avoid damage to the sheep.

Elasticized side edge portions 22 are provided, and function to cause the lower portion of the coat sides to tuck under the belly slightly, thereby providing additional fleece protection. This "tuck under" is of great importance when the coat is to be employed for the protection of the fleece of a sheep which is destined for chemical shearing, where it is desirable to contain the fleece prior to its removal, after the administration of a dewooling agent.

The sheep coat thus described and illustrated can be produced with great economy, and represents a new minimum in the labour costs incurred in its use. It has been found that a range of four sizes of coat of this design is sufficient to adequately provide for all varieties of sheep and lambs. The efficiency of the design in the avoidance of snagging was illustrated recently when 350 sheep wearing coats of the subject design were put through two barbed wire fences by a mob of dingoes. Only three coats were removed.

It will be appreciated that while the present invention has been described with reference to a particular preferred embodiment herein, it is not to be regarded as restricted in its scope thereby.

I claim:

1. A coat for a four-legged wool-growing animal, comprising a flexible sheet provided with fixed, nonadjustable ties for attachment to the hind legs of the animal, and having a circumferentially elastic rear free edge adapted to pass in an approximately vertical plane around the rump of the animal.

2. A coat as defined in claim 1, wherein said ties are formed by slits in the sheet adjacent its side edges.

3. A coat as defined in claim 1, wherein the lower portion of each front edge of the sheet is joined to the other to form a portion adapted to pass around the chest of the animal, the upper, free front edge portion forming a neck aperture which comprises a circumferentially elastic portion separated by inelastic portions from said chest-surrounding portion.

4. A coat as defined in claim 3, wherein no ties are employed for the forelegs of the animal.

5. A coat as defined in claim 1, comprising a pair of free side edges, each being linearly elastic over that part of its length which extends between the animal's front and back legs.

6. A coat as defined in claim 3, comprising a pair of free side edges, each being linearly elastic over that part of its length which extends between the animal's front and back legs.

* * * * *